Nov. 30, 1965
T. J. GRUBER ETAL
3,220,375
LUBRICATION INDICATOR
Filed March 28, 1963
3 Sheets-Sheet 1
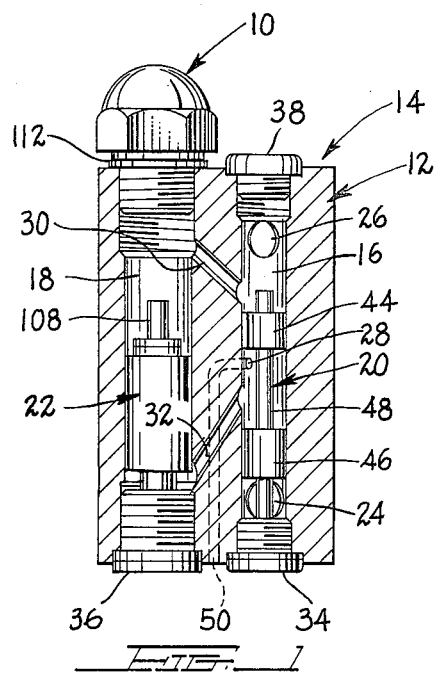
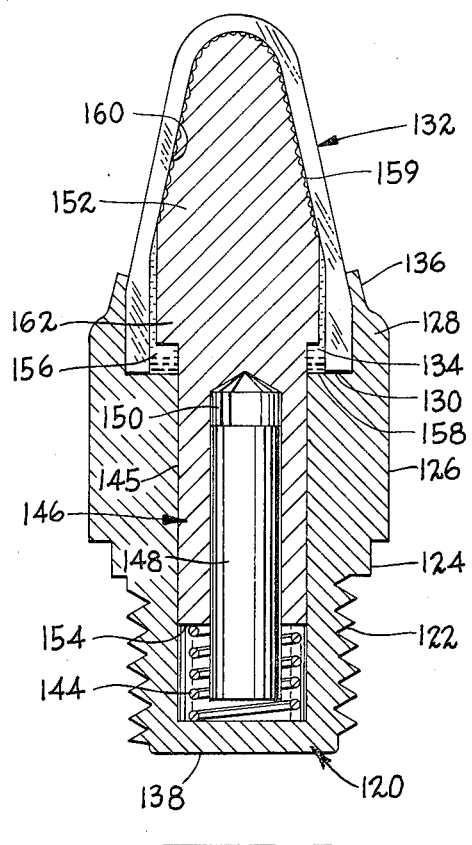
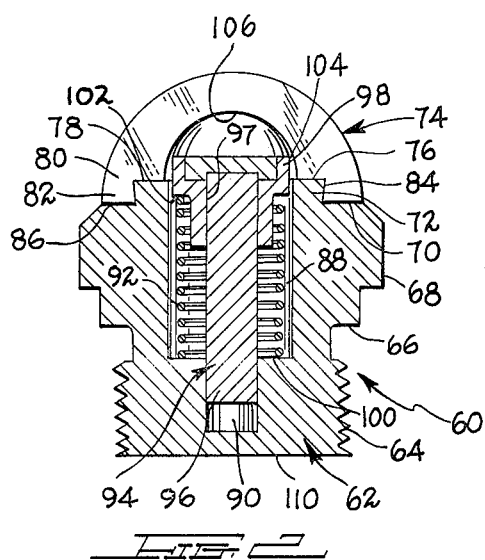
INVENTOR.
Thomas J. Gruber
BY Robert C. Stursky
Teagno, Stowe & Sadler
Attorney Nov. 30, 1965   T. J. GRUBER ETAL   3,220,375
LUBRICATION INDICATOR
Filed March 28, 1963   3 Sheets-Sheet 2
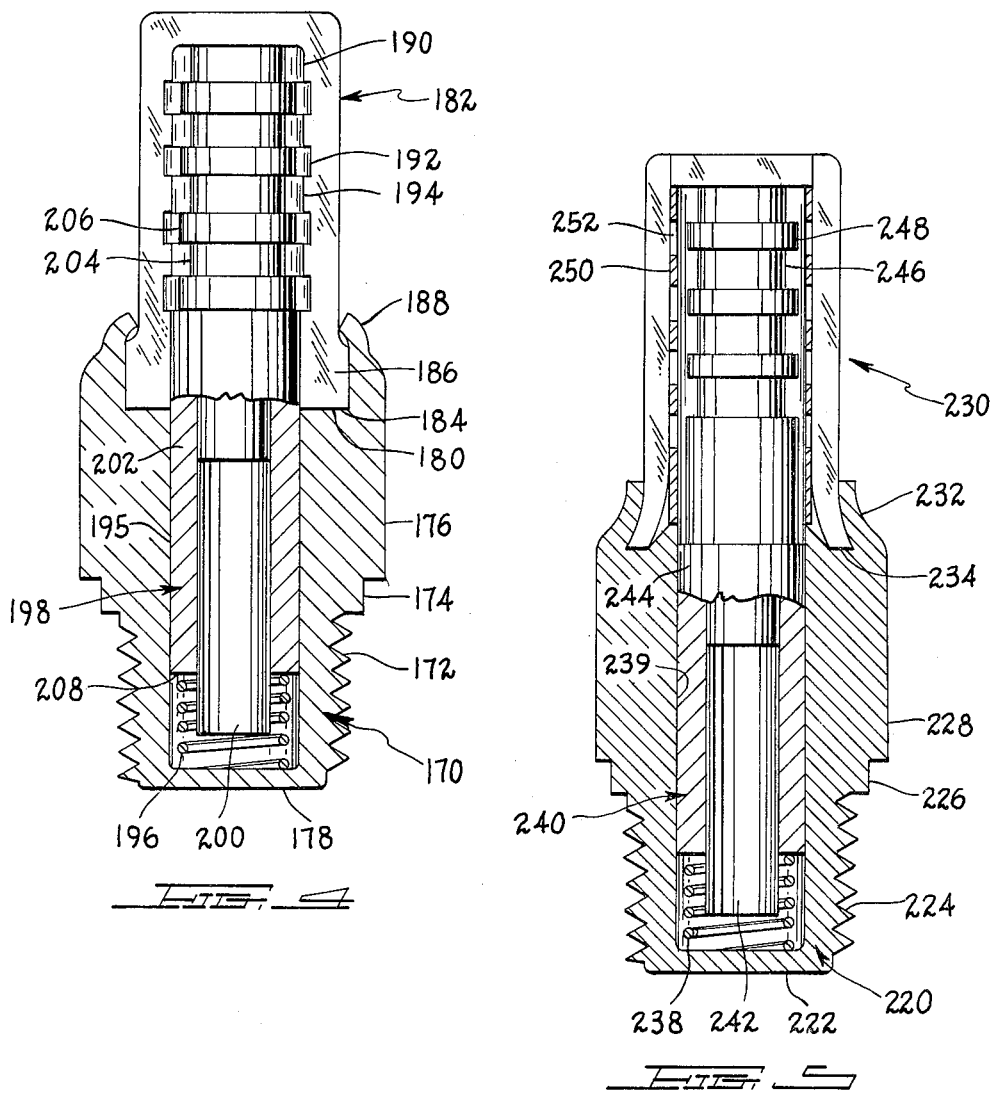
INVENTOR.
Thomas J. Gruber
BY Robert C. Stuemky
Teague, Stover & Sadler
Attorney Nov. 30, 1965 T. J. GRUBER ETAL 3,220,375
LUBRICATION INDICATOR
Filed March 28, 1963 3 Sheets-Sheet 3
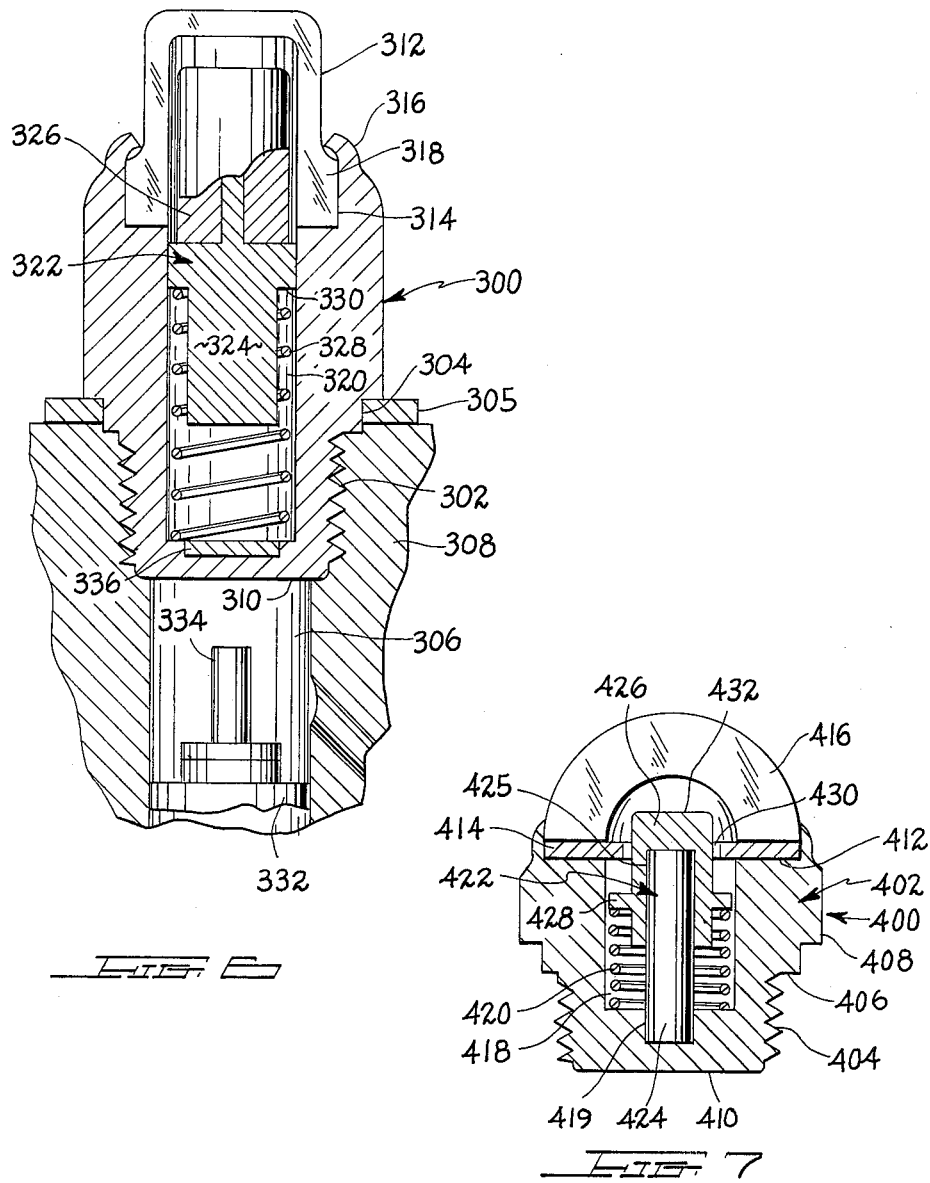
INVENTOR.
Thomas J. Gruber
BY Robert E. Struemky
Laguo, Stover & Sadler
Attorney United States Patent Office 3,220,375
Patented Nov. 30, 1965

3,220,375
LUBRICATION INDICATOR
Thomas J. Gruber, Chagrin Falls, Ohio, and Robert E. Stuemky, Royal Oak, Mich., assignors to Eaton Manufacturing Company, Cleveland, Ohio, a corporation of Ohio
Filed Mar. 28, 1963, Ser. No. 268,728
7 Claims. (Cl. 116—70)

This invention relates to indicators of the type responsive to an adjacent operating mechanism to indicate the proper functioning or malfunctioning of the operating mechanism. More specifically, this invention pertains to a novel indicating device of the visual magnetic type responsive to the operation of any conventional piston-type lubricator valve mechanism to indicate functioning or malfunctioning of such a valve.

The novel visual indicator of this invention is adaptable for use with fluid flow control mechanisms of the lubricator valve type that operate on a metering valve principle by permitting and controlling the supply of fluid lubricant to parts, such as bearings, of an operating structure. There are several conventional lubricator valve mechanisms that contain a single or a plurality of reciprocating piston members mounted within a valve body for receipt of a fluid lubricant from a pump to distribute such lubricant to bearings or the like. One conventional lubricator valve mechanism is called the progressive system-type wherein piston elements, upon receipt of pressurized lubricant from a pump, transfer the lubricator to bearings, the piston elements cooperating so that each piston is controlled by the operation of another piston, the latter making the necessary interconnections to still another piston when it operates, resulting in an operation which proceeds in a generally cyclic fashion, so that the lubricant displaced by the movement of each piston represents a metered amount of fluid discharged to each connected bearing. A lubricator valve mechanism of this type is disclosed in U.S. Patent No. 2,792,911.

Another conventional lubricator valve mechanism is the dual line predetermined pressure system-type in which a piston member reciprocates in response to pressurized lubricant intermittently supplied by a pump to allow a metering valve to pass a charge of lubricant to a bearing member.

In these and other types of lubricating systems using piston-type lubricator valve mechanisms, malfunctioning of the lubricator valve mechanism could not be readily ascertained through a visual inspection of the lubricator valve body. In situations in which a particular piston member of the lubricator valve mechanism failed to properly operate due to, for example, the bearing being served by a piston member becoming plugged, visual inspection of the lubricator valve body area would not indicate that the lubricator valve was not properly operating. It is therefore advantageous to provide in conjunction with such a lubricator valve mechanism readily visible means that will indicate to the operator that the lubricator valve is not properly functioning.

It is therefore an object of this invention to provide novel visual indicating means that will indicate improper functioning of a piston-type lubricator valve mechanism.

It is a further object of this invention to provide a novel visual indicator of the magnetic-type for indicating proper functioning of piston-type lubricator valve mechanisms.

It is still a further object of this invention to provide a novel visual indicating device of the magnetic, self-sealing, packless type capable of withstanding high fluid system pressures.

It is also a further object of this invention to provide a novel visual indicator that will indicate proper functioning of a piston-type lubricator valve mechanism which is self-contained and enclosed from the lubricant passing through the lubricator valve mechanism.

Still another object of this invention is to provide a novel visual indicator containing a magnetic slide which in various positions will indicate functioning or malfunctioning of an operating mechanism.

It is still another object of this invention to provide a novel visual indicator incorporating a colored, magnetic slide element positionable within a transparent bonnet for indicating function or malfunction of adjacent operating mechanism.

It is also another object of this invention to provide a visual indicator that has few working parts, is easily assembled, durable in operation and economical to produce.

Further objects and novel features of this device will become apparent upon a reading of the following specification taken in cooperation with the enclosed drawings in which:

FIGURE 1 discloses a cross-sectional view of one type of piston-type lubricator valve with one form of the novel indicator of this invention positioned therein.

FIGURE 2 discloses a longitudinal cross-sectional view of one form of the novel indicator of this invention.

FIGURE 3 discloses a longitudinal cross-sectional view of another form of the novel indicator of this invention.

FIGURE 4 discloses a longitudinal cross-sectional view of still another form of the novel indicator of this invention.

FIGURE 5 discloses a longitudinal cross-sectional view of a further form of the novel indicator of this invention.

FIGURE 6 discloses a longitudinal cross-sectional view of a still further form of the novel indicator of this invention positioned within the metering valve chamber of one type of piston-type lubricator valve.

FIGURE 7 discloses a longitudinal cross-sectional view of an additional form of the novel indicator of this invention.

Reference is now made to FIGURE 1, wherein there is shown a typical piston-type lubricator valve incorporating one form of the novel indicator of this invention that will give visual indication of proper operation of the lubricator valve. This lubricator valve is of the dual line predetermined pressure type that functions in response to fluid lubricant passed thereto to intermittently supply lubricant to a bearing member. This particular lubricator valve, however, is only disclosed for the purpose of illustrating one form of utility of the novel indicator of this invention in one form of piston-type lubricator valve. The various forms of the novel indicator of this invention can be utilized in other and different environments or with other and different types of conventional piston-type valves. As will become apparent hereinafter, all of the various modifications of the novel indicator could be used to indicate movement or completion of movement of any form of concealed piston.

As shown in FIGURE 1, the valve body member 12 of the lubricator valve 14 has a pair of parallel chambers therethrough, one of which at 16 is the valving piston chamber and the other at 18 is the metering piston valve chamber. The chambers 16 and 18 contain a pair of piston members 20 and 22 that allow the valve to function as a fluid flow control mechanism, as will become apparent hereinafter. The piston members 20 and 22 are mounted respectively in chambers 16 and 18 for free-reciprocatory movement, with piston member 22 functioning as a metering valve. The chamber 16 contains a pair of inlets 24 and 26 and an outlet at 28. The valve body member 12 also contains a pair of diagonal passageways at 30 and 32 that provide communication between the chambers 16 and 18. At the lower end of the valve body member 12, the chambers 16 and 18 are closed and sealed by plug members 34 and 36, respectively. The upper end of chamber 18 has one form of the novel indicator of this invention at 10 inserted in the end thereof. The upper end of chamber 16 is closed and sealed by a plug member 38. The piston member 20 comprises a pair of imperforate cylinders 44 and 46 secured together for unilateral reciprocation within the chamber 16 by a connecting rod 48. Piston member 20 functions in cooperation with the metering valve piston 22 upon intermittent alternating receipt of pressurized fluid through inlets 24 and 26 to supply fluid lubricant through outlet 28 to lubricate a bearing member (not shown).

In the operation of the lubricator valve shown in FIGURE 1, lubricant under pressure supplied to inlet 24 will force piston member 20 upwardly within the chamber 16 so that the lower part of the chamber is in unrestricted communication with chamber 18 by way of passageway 32. The lubricant will pass through diagonal passageway 32 into chamber 18 to force the metering valve piston 22 in an upward direction. This will force the lubricant left within the chamber 18 between the metering valve piston 22 and the base of indicator 10 from the previous operating cycle through diagonal passageway 30 back into chamber 16. Since the original entry of the lubricant under pressure through inlet 24 forced piston member 20 upwardly within the chamber 16, the cylinders 44 and 46 thereof would be respectively located between diagonal passageway 30 and inlet 26, and between diagonal passageway 32 and outlet 28. Due to the position occupied by piston member 20, the charge of lubricant forced down diagonal passageway 30 by the upward motion of metering valve piston 22 will escape out through the outlet 28 and pass through the housing at point 50 to a bearing member by way of a lubrication line (not shown). A subsequent entry of pressurized lubricant through inlet 26 will cause piston member 20 to move downwardly to the position shown in FIGURE 1, wherein the lubricant under pressure would transfer from chamber 16 to chamber 18 by way of diagonal passageway 30. This will cause metering valve piston 22 to move downwardly forcing the charge of fluid left between metering valve piston 22 and plug 36 by the previous sequence of operation to transfer from chamber 18 to chamber 16 by way of diagonal passageway 32. As is apparent in FIGURE 1, the position of piston member 20 in this sequence of operation closes off all openings within the chamber 16 except the outlet 28 through which the lubricant would pass to the bearing, as in the previous sequence of operation. Application of lubricant under pressure to the inlet 24 will now result in a repeating of the operation of the lubricator valve in the manner set forth above.

In the operation of a piston-type lubricator valve as illustrated in FIGURE 1, the metering valve piston will fail to reciprocate within the valve body should, for example, the bearing being served by the metering valve piston become plugged. The various forms of the novel indicator of this invention give visual indication of the static condition of such a metering valve piston member in a piston-type lubricator valve so that the cause of such can be determined and the valve repaired. As shown at 10 in FIGURE 1, the chamber 18 has one form of the novel indicator of this invention inserted in the end thereof. When a piston-type lubricator valve properly operates, the reciprocatory movement of the metering valve piston within the chamber 18 will cause repeated activation of the novel indicator giving indication to the operator of the lubricating system in which the valve is used that the valve is properly functioning. Should, however, the metering valve piston come to rest, the novel indicator will indicate the same, as will become more clearly apparent hereinafter.

The lubricator valve is part of a lubricating system comprising a device for supplying pressurized lubricant to the valve, such as a pump, and lubricant conduits or lines that carry lubricant from the valve to bearings. The entire lubricating system may consist of a plurality of valves, wherein the metering valve pistons of the valves should be in same position, either all moved up or all moved down in their respective chambers. The lubricating system may be operated every few minutes, every few hours or once a day. In such a lubricating system, the indicators would likewise be in the same respective position and should one valve not operate, the indicator associated therewith would be out of phase with the remaining indicators to indicate which valve was inoperative.

Attention is now directed to FIGURE 2 of the drawing which discloses one form of the novel indicator of this invention that is readily adaptable for use in a piston-type lubricator valve to indicate the proper functioning of the valve. The indicator at 60 comprises a hollow, non-magnetic body member 62 that is substantially cylindrical in longitudinal extent. The body member 62 has threads 64 and shoulder 66 thereon for proper securement and sealing, respectively, of the indicator within an opening in a lubricator valve housing. A further shoulder portion 68 on the end of the body member 62 opposite thread portion 64 is hexagonal in shape so that the indicator 60 can be readily turned into and tightened in proper securing relationship within a lubricator valve housing. The end of the indicator 60 adjacent shoulder portion 68 is recessed at 70 to provide a substantially cylindrical projection 72 which receives a transparent bonnet 74 formed of suitable material such as glass or plastic. The projection 72 increases in diameter throughout its longitudinal extent so as to be wider at the end 76 thereof than at the point of juncture with recess 70, thus providing a cylindrical extending lip 84. The transparent bonnet 74 contains a recess 78 and a substantially cylindrical projection 80, the latter being wider at its end 82 than at the point of juncture with recess 78 to provide a cylindrical extending lip 86 for mating with lip 84 of projection 72 on body 62. It is therefore apparent that lip 86 of the bonnet 74 can be snapped over the lip 84 of the body member 62 so that the bonnet can be retained on the body member. It may also be preferable for proper permanent securement of the bonnet 74 to the body member 62 that suitable bonding or adhering material be used between the respective cylindrical projections 72 and 80. It should also be noted that bonnet 74 is generally dish-shaped in configuration enabling the same to be adaptable as an optical magnifier of the indicating element visible therethrough, as will become apparent hereinafter.

The body member 62 also contains a pair of substantially cylindrical chambers 88 and 90. The chamber 88 receives a compression spring 92 of non-magnetic material, and the chamber 90 receives a slider 94. The slider 94 comprises a permanent magnet 96 and colored indicating element 98 of a substantially Z-shape in longitudinal cross-section. The magnet 96 is secured within an opening 97 in the indicating element 98 by press-fitting, gluing, or other suitable means. The compression spring 92 is mounted between the seat portion 100 of the body 62 and a shoulder 102 of indicating element 98. Since the body member 62 of the indicator is formed of non-magnetic material, the magnet 96 is not influenced thereby, thus allowing the slider 94 to be normally outwardly biased to a position where shoulder portion 104 of the colored element 98 is positioned adjacent the inner face 106 of the transparent bonnet 74.

In the operation of the novel indicator 60 shown in FIGURE 2, in a lubricator valve, such would be positioned in the lubricator valve in the same manner as indicator 10 shown in FIGURE 1. The body member and compression spring of the indicator are formed of non-magnetic material. However, the metering valve piston within the lubricator valve is formed of magnetically permeable material, thus permitting only the action of the metering valve piston to influence the magnet and colored indicating element of the indicator. As the metering valve piston 22, shown in FIGURE 1, would reciprocate during operation of the lubricator valve, the end portion 108 of the metering valve piston would move toward and away from the base portion 110 of the indicator 60 in substantially axial alignment with magnet 96 of the indicator. Since the metering valve piston of the lubricator valve is formed of magnetically permeable material, the magnet and colored indicating element 98 would be attracted toward the metering valve piston against the action of spring 92 as the end portion 108 of the metering valve piston moves adjacent to the base portion 110 of the indicator. At this moment, the colored indicating element 98 would not be visible in the transparent bonnet 74, such being withdrawn into chamber 88. When, however, the metering valve piston moves away from the indicator, the spring 92 would then force the magnet and colored indicating element back up into the transparent bonnet 74 so as to be visible therethrough.

It thus becomes apparent, that as the metering valve piston 22 of a lubricator valve, as shown in FIGURE 1, reciprocates back and forth during operation, the colored element within the indicator would come into and go out of view through the transparent bonnet of the indicator. Should the metering valve piston fail to properly function, as mentioned above, then the slider and colored indicating element would no longer reciprocate since the metering valve piston in the lubricator valve would be substantially stationary. The colored indicating element would then move permanently into or out of view through the transparent bonnet of the indicator, depending upon the particular point in reciprocatory movement the metering valve piston came to rest. In this manner, the operator of the lubricating system in which the lubricator valve is used, can readily determine through visual inspection of a lubricator valve body area whether the valve is properly functioning.

The form of novel indicator shown in FIGURE 2, is self-sealing with respect to the operating portions of the lubricator valve. Lubricator valves of the piston-type when used in certain lubrication systems can operate at very high pressure in the area of 3,500 p.s.i. and, therefore, the indicating device used in conjunction therewith must be able to withstand such high pressures. The novel indicator of this invention by containing threads 64, shoulder 66, shoulder 68 and a unitary base portion 110 along with a washer, as shown at 112 in FIGURE 1, forms a closure plug sealing off the end of the metering valve chamber so that the indicator is self-sealing in the lubricator valve housing and does not require any special leakage preventing packing therearound to properly operate under extreme pressures. Furthermore, base portion 110 of this novel indicator, by being unitary with the remainder of the body portion, completely encloses the indicator from the effects of the fluid lubricant passing through the valve.

Reference is now made to FIGURE 3, wherein there is disclosed a further form of the novel indicator of this invention. This form of the novel indicator also comprises a hollow, non-magnetic body member at 120. The body member 120 is threaded at 122 and has shoulder portions 124 and 126 for proper self-sealing securement of the novel indicator into a lubricator valve in the same manner as the modification disclosed in FIGURE 2. Body member 120 is of substantially cylindrical longitudinal shape and contains at end 128 a cylindrical recess 130 for receipt of a transparent bonnet 132. The bonnet 132 is substantially conical in shape and has an open end 134 positioned within the cylindrical recess 130 of the body member. This bonnet is formed of glass, plastic or other suitable transparent material in the same manner as the bonnet of the novel indicator disclosed in FIGURE 2. The edge of the bonnet 132 at its open end 134 is of enlarged cross-sectional thickness for cooperation with a cylindrical inturned lip 136 of the body member so that the bonnet can be retained within the body member. Other suitable securing or bonding materials, such as glue, for example, may be used between the lip 136 and the bonnet for proper retention of the bonnet within the body member. The end portion 138 of the body member that is adaptable for insertion within a metering valve chamber of a lubricator valve is unitary with the body member, enabling this form of the novel indicator to be completely enclosed from the lubricant within the valve in the same manner as that described with reference to the novel indicator disclosed in FIGURE 2.

The form of the novel indicator shown in FIGURE 3 also contains a non-magnetic compression spring 144 and slider 146 mounted within the chamber 145 of the body member. The slider 146 comprises a permanent magnet 148 and colored indicating element 152, the magnet being secured within a cylindrical opening 150 in the colored indicating element. Compression spring 144 acts against the end portion 138 of the body member and end 154 of indicating element 152 to normally outwardly bias the indicating element into the bonnet 132. The indicating element 152 is of a substantially bullet shape, and during the normally outwardly biased position is visible through the transparent bonnet. In the area of the open end 134 of the bonnet 132, the indicating element 152 has an enlarged shoulder 162 extending into recess 130. The shoulder area 162 of the indicating element 152 is, however, of smaller cross-sectional diameter than the internal diameter of the open end 134 of the bonnet, thus providing a substantially cylindrical space 156 between the indicating element and the bonnet. The space 156 is filled with a fluid 158 of a different color than that of indicating element 152.

In the operation of the novel indicator shown in FIGURE 3 is the lubricator valve environment, the indicator would be positioned within the end of a metering valve chamber in a lubricator valve in the same manner as indicator 10 shown in FIGURE 1. In this environment, when the metering valve piston of the lubricator valve is retracted to the position shown in FIGURE 1, the compression spring 144 would normally outwardly bias the colored indicating element 152 so as to be visible through the transparent bonnet 132. When, however, the end 108 of the metering valve piston in the lubricator valve moves adjacent end portion 138 of the body member, the magnetically permeable metering valve piston would attract magnet 148 and colored indicating element 152 against the action of spring 144. This would cause the enlarged shoulder 162 on indicating element 152 to displace the colored fluid 158 in space 156 resulting in the colored fluid 158 filling the space present between the colored indicating element 152 and the inner surface 160 of the transparent bonnet 152. Since the fluid 158 is of a different color than the colored indicating element 152, a different color would now appear in the transparent bonnet giving an indication of the proximity of the end portion of the piston member to the end portion 138, thus giving an operator indication of the particular position of the metering valve piston in the lubricator valve.

It should also be noted that the indicating element 152 contains an irregular outer surface 159 to prevent surface tension that may develop between element 152, fluid 158 and inner surface 160 of bonnet 152 from enabling the magnetic attraction of the slider to the metering valve to withdraw the indicating element 152 into the body member. The fluid 158 is preferably black free-flowing liquid, and the indicator 152 is preferably white or light-colored. This modification of the novel indicator has an advantage in that only a slight movement of the slider is required to obtain the necessary visual effect, thus enabling the magnet to be sufficiently sensitive with a lower value of magnetic flux.

In the above manner, continual change in the appearance of colored indicating means gives the operator of the lubricating system in which the piston-type lubricator valve is utilized, an indication that the valve is properly functioning. In a manner similar to the operation of the novel indicator disclosed in FIGURE 2, as soon as one color, either that of the indicating element or the colored fluid is the only color continually visible through the transparent bonnet, the operator of the lubricating system will know that the metering valve piston of the lubricator valve with which the indicator is associated is in a static position, and the valve needs to be repaired.

Reference is now made to FIGURE 4, wherein there is shown a further modification of the novel indicator of this invention that is also readily adaptable for use in the environment of piston-type lubricator valves to indicate proper functioning of a metering valve piston. This form of the novel indicator also contains a substantially cylindrical, hollow, non-magnetic body member 170, which is threaded at 172 and has shoulders 174 and 176 for proper securing and self-sealing of the indicator within a piston chamber of a piston-type lubricator valve. The end 178 on this form of the indicator is also unitary with the remainder of the body member for properly enclosing the indicator from the lubricant in the lubricator valve in the same manner as that described in reference to the indicator disclosed in FIGURE 2. The body member 170 has a cylindrical recess 180 therein for receipt of a transparent bonnet 182 which is formed of glass, plastic, or other suitable transparent material. This bonnet 182 is open at end 184 thereof and has an enlarged shoulder portion 186 that cooperates with a spun-over lip 188 on the body member for proper securing of the bonnet within the body member. An adhesive or other suitable securing aid may also be used around the outer periphery of the enlarged shoulder 186 to aid in securing the bonnet within the recess. The inner surface 190 of the bonnet member 182 is formed with alternately grooved and projecting portions at 192 and 194 respectively, for reasons to become more clearly apparent hereinafter.

The body member 170 of the novel indicator shown in FIGURE 4, contains a non-magnetic compression spring 196 and slider 198 mounted within chamber 195 of the body member. The slider 198 comprises a permanent magnet 200 and a substantially cylindrical indicating element 202. On the portion of indicating element 202 extending within the transparent bonnet 182 are a set of grooved and projecting portions 204 and 206 respectively, each of which are in transverse alignment with a respective projecting portion 194 and grooved portion 192 when the indicating element 202 is in the fully extended position within the bonnet. The grooves 192 and 204 are the same color, while the projecting portions 206 are a different color than grooves 192 and 204; and the projecting portion 194 would be transparent. In this manner, when the indicating element 202 is in the fully extended position as shown in FIGURE 4, only one color would be exhibited, since projecting portion 206 would overlap with the grooves 192 on the bonnet. When, however, the indicating element 202 is retracted within the body member against the action of spring 196 due to the proximity of the metering valve piston of the lubricator valve, for example, then an alternate striped appearance of portions 206 and grooves 192 would be visible through the bonnet member.

The modification of the novel indicator shown in FIGURE 4, is adaptable for use in the environment of a piston-type lubricator valve in the same manner as the forms of the novel indicator disclosed in FIGURES 2 and 3. The compression spring 196, acting against the end 208 of the indicating element 202, causes the indicating element to be fully inserted within the bonnet when the metering valve piston is in the retracted position as shown in FIGURE 1. When, however, the magnetically permeable metering valve piston of the lubricator valve moves adjacent the end 178 of the indicator, then the magnet 200 and indicating element 202 are retracted within the body member giving the alternate striped appearance through the transparent bonnet, as mentioned above.

The modification of the device disclosed in FIGURE 5 is similar to that of FIGURE 4 except different means is utilized for arriving at the striped appearance of the indicating element. In like manner, this modification can be utilized, for example, in the environment of a piston-type lubricator valve. This form of the novel indicator also comprises a cylindrical, hollow, non-magnetic body member 220 which is closed at end 222 and has threads 224 and shoulders 226 and 228 for proper self-sealing securement of the indicator within a piston chamber of a piston-type lubricator valve and enclosure from lubricant therein in the same manner as that described in reference to the modification shown in FIGURE 2. The body member 220 has a cylindrical recess therein for receipt of a substantially cylindrical transparent bonnet 230 and contains a lip portion 232 that cooperates with an outwardly extending substantially cylindrical open end portion 234 of the bonnet to properly secure the bonnet within the body member. The bonnet in this form of the novel indicator may also be formed of suitable transparent material such as glass or plastic, and additional securing means such as an adhesive may also be used to aid in securing the bonnet to the body member.

The modification of the device shown in FIGURE 5, contains a non-magnetic compression spring 238 and slider 240 of the same type as that shown in the novel invention of FIGURE 4, mounted within chamber 239 of the body member. The slider 240 comprises a permanent magnet 242 and a substantially cylindrical indicating element 244. The indicating element 244 contains alternate grooves and projecting portions 246 and 248 of different colors on the end portion thereof that extend within the bonnet in the same manner as in the modification shown in FIGURE 4. Mounted within the transparent bonnet 230 is a substantially cylindrical tube 250 that is of the same color as that of grooves 246. The tube 250 has circumferentially spaced transversely aligned openings 252 therein that are aligned with the projecting portions 248 when the indicating element is fully extended into the bonnet. Thus, when the indicating element 244 is in the fully extended position within the bonnet as shown in FIGURE 5, the alternate striped appearance of projecting portions 248 and cylindrical tube 250 would be visible through the bonnet. When, however, the indicating element is fully retracted within the body member of the indicator against the action of spring 238, the grooves 246 would overlap with the openings 252 so that only the one color of tube 250 and grooves 246 would appear through the transparent bonnet.

In operation of the novel indicator disclosed in FIGURE 5, in the environment of a piston-type lubricator valve, the indicator would be inserted within the end of the metering valve chamber in the lubricator valve in the same manner as the previous forms of the novel indicator discussed above. When the metering valve piston of the lubricator valve is in the retracted position as shown in FIGURE 1, the compression spring 238 would bias the indicating element to the fully extended position within the bonnet 230, resulting in a striped appearance through the bonnet, as discussed above. When, however, the metering valve piston moved upwardly within the piston chamber of the lubricator valve, proximity of the magnetically permeable metering valve piston would attract the permanent magnet resulting in the slider 240 being retracted within the body member of the indicator against the action of the spring 238 giving the above mentioned continuous color appearance to the bonnet member.

It is therefore apparent that each of the modifications of the novel indicating element disclosed in FIGURES 4 and 5 can function through continual color change to indicate to the operator of the lubricating system in which the lubricator valve of the piston-type is utilized, that the metering valve piston is properly operating. When, however, only a single color or a continuous striped appearance is visible through the transparent bonnet of the indicator, then the operator of the lubricating system would know that the metering valve piston was stationary, and thus the valve was not properly functioning and needed repair.

Reference is now made to FIGURE 6, wherein a further modification of the novel indicator of this invention is disclosed as being inserted within the end of a metering valve chamber for purposes of illustrating the operation of this form of indicator. This indicator operates generally on the same principle as the previously described modifications, in that a colored indicating element reciprocates into and out of view through a transparent bonnet member in response to movement of an adjacent operating mechanism, such as a metering valve piston within a lubricator valve. This form of the novel indicator comprises a substantially cylindrical, hollow, non-magnetic body member 300 containing threaded portions 302 and shoulder portions 304 for proper securement and along with washer 305 self-sealing of the indicator within the end of the metering valve chamber 306 of a lubricator valve 308 as illustrated in FIGURE 6. Further, the end portion 310 of the body member is unitary with the remainder of the body member to properly enclose the indicator from the lubricant passing through the valve as in the previous modifications of this novel invention. A transparent bonnet 312 is secured within recessed portion 314 on the body member, the body member containing a turned-over lip 316 that cooperates with enlarged shoulder 318 of the bonnet to secure the bonnet within the recess. The bonnet 312 is formed of suitable transparent material such as glass or plastic, and may be provided with additional securing means such as an adhesive at shoulder 318 to aid in retaining the bonnet on the body member. The body member contains a substantially cylindrical chamber 320 in which a slider 322 is mounted. The slider 322 comprises a substantially cylindrical magnetically permeable portion 324 carrying a colored indicating element 326. A non-magnetic spring member 328 positioned between the bottom of chamber 320 and shoulder 330 on portion 324 normally outwardly biases the slider 322, and thus the indicating element 326 into view through the transparent bonnet 312. The metering valve piston member 332 of the lubricator valve carries a permanent magnet 334 in the end thereof. Positioned in the body member 300 adjacent the bottom of chamber 320 is a soft iron plug 336 which aids in obtaining a good flux path between magnet 334 and magnetically permeable portion 324 of the slider.

In the operation of the modification disclosed in FIGURE 6, the slider 322 is normally outwardly biased by spring 328 so that indicating element 326 is visible through bonnet 312. As the metering valve piston 332 moves within the chamber 306 during normal lubricator valve operation, the magnet 334 will approach the end portion 310 of the body 300 to attract the magnetically permeable portion 324 of the slider resulting in the slider, and thus the colored indicating element 326 being retracted into the body member of the indicator against the action of the spring 328. As the metering valve piston 332 moves downwardly during its operation, the rate of spring 328 will eventually overcome the force of the attraction of magnet 334 to portion 324 and normally outwardly bias the slider, and thus colored indicating element 326 into view through the bonnet 312. In this manner, a continual reciprocating of the slide 322 in chamber 320 of the indicator will indicate to the operation of a lubricating system in which the valve is being used, that the lubricator valve is properly functioning. Once, however, the indicating element 326 is permanently into or out of view through the bonnet 312, then the operator of the lubricating system will have readily visible indication that the metering valve piston member and the lubricator valve are not properly functioning and need to be repaired.

Reference is now made to FIGURE 7, wherein a still further form of the novel indicator of this invention is shown. This form of the novel indicator is similar to that disclosed in FIGURE 2 and is also adaptable for use in a piston-type lubricator valve to indicate the proper functioning of the valve. The indicator at 400 comprises a hollow, non-magnetic body member 402 containing threaded portion 404 and shoulders 406 and 408 for properly securing and sealing the indicator within a metering valve chamber of a piston-type lubricator valve in the same manner as the previously described modifications of the novel indicator. The end portion 410 of this form of the indicator is unitary with the remainder of the body member for properly enclosing the indicator from the lubricant in a lubricator valve in the same manner as that described in reference to the other forms of the indicator. The body member 402 has a cylindrical recess 412 which receives a guide 414 and transparent bonnet 416. Bonnet 416 is formed of glass, plastic or other suitable transparent material and is secured to the body member 402 by a suitable adhesive or clamping arrangement such as those of the previous forms of the indicator. It is also apparent that the guide 414 may aid in securing and sealing the bonnet to the body member.

The body member 402 also has a pair of substantially cylindrical chambers 418 and 419 which receive a non-magnetic compression spring 420 and slider 422, respectively, as in form of the indicator disclosed in FIGURE 2. The slider 422 comprises a permanent magnet 424 suitably secured within the opening 425 of a colored indicating element 426. Indicating element 426 contains a shoulder portion 428 against which spring 420 is positioned for normally outwardly biasing the slider in the chamber 418 and bonnet 416. The guide 414 has a substantially centrally disposed opening 430 which receives the upper portion 432 of the slider. The cooperation of the slider with opening 430 in guide 414 provides a bearing support for the slider. Furthermore, the shoulder portion 428 of indicating element 426 cooperates with the guide 414 to limit the outward travel of the slider so that the slider will not contact the bonnet.

In the operation of the novel indicator disclosed in FIGURE 7, in a lubricator valve, such would be positioned within a metering valve chamber for actuation by a metering valve piston to indicate proper valve function as in the previous forms of the invention. In this environment, when the metering valve piston of the lubricator valve moves adjacent the end portion 410 of the indicator, the magnetically permeable metering valve piston would attract the magnet 424 to retract the colored indicating element 426 within the valve to a position as shown in FIGURE 7. In this position of movment, the colored indicating element would not be visible through the bonnet 416 of the indicator. When, however, the end portion of the metering valve piston was retracted within the lubricator valve to a position as shown in FIGURE 1, the spring 420 would outwardly bias the slider to a position wherein shoulder 428 of the colored indicating element would abut guide 414 so that the indicating element would be visible through the bonnet 416. In this manner, as in the previous form of the novel indicator, reciprocation of the colored indicating element into and out of view through the bonnet would indicate to the operator of a lubricating system in which the valve is utilized that the valve is properly functioning. Furthermore, in the same manner as the previous forms of the invention, when the colored indicating element is permanently into or out of view through the transparent bonnet, the operator of the lubricating system would know that the valve is malfunctioning.

In the application of the various forms of the indicator of this invention to devices such as lubricator valves of the piston-type or any structure containing a reciprocating, concealed piston member, these devices may be positioned so that the piston member is vertically or horizontally disposed. In the use of any form of the indicator, the rate of the spring normally outwardly biasing the colored indicating element of the indicator may have to be varied or the spring itself removed from the indicator depending upon the disposition of the piston member. When an indicator of this invention is mounted above a vertically disposed piston member, the force of gravity acting on the slider would tend to hold the slider in a withdrawn poistion within the indicator. When a piston member so disposed is withdrawn within its housing, the rate of the spring used to normally outwardly bias the slider must be sufficient to not only overcome the magnetic attraction of the piston member to the magnet of the slider but also the force of gravity acting on the slider. When the device containing the movable piston is mounted so that the piston member is in a horizontal position, there is no direct gravitational force tending to withdraw the slider within the indicator, however, there is frictional force resulting from gravitational force resisting slider movement in either direction. In either of the above piston member positions, the rate of the spring or magnetic attraction of the slider to the piston member can be varied to facilitate proper operation of the indicator so that the slider and thus the indicating element will be responsive to the movement of the piston member. When a device containing the movable piston is mounted so that the indicator utilized therewith is inverted from the position shown in FIGURE 1, the gravitational force and the force of the spring within the indicator would be operating in the same direction. In this type of situation, it may be required to remove the spring from the indicator to facilitate the operation of the indicator in response to the movement of the piston member.

It therefore becomes apparent that the various forms of the novel indicator of this invention, through the use of a permanent magnet concept in conjunction with some type of colored indicating means, can each readily function in the environment of a piston-type lubricator valve to indicate to the operator of a lubricating system that the valve is properly operating.

While we have illustrated and described the novel indicator of this invention in the form of several preferred embodiments and in a particular environment, it is to be understood that these particular embodiments and the particular environment in which they have been described are both capable of modification, and therefore, we desire to avail ourselves of changes and alternations which fall within the scope and purview of the appended claims.

We claim:

1. A lubricator comprising, in combination:
   a lubrication valve for periodically supplying a measured quantity of lubricant to a part of an operating structure, and
   an indicator for indicating proper operation of said lubrication valve,
   said lubrication valve comprising:
   a valve body having a valving piston chamber therein,
   said valve body further having at least one fluid inlet passage and one fluid outlet passage,
   said fluid inlet and outlet passages being in communication with said valving piston chamber,
   a valving piston member mounted for reciprocation within said valving piston chamber,
   said valve body further having a metering piston chamber in communication with said valving piston chamber by a plurality of passageways,
   a metering piston member mounted for reciprocation between first and second positions within the metering piston chamber in response to lubricant flow through the passageways in the valve body,
   said metering piston chamber being closed at one end thereof by said indicator,
   said indicator comprising:
   a body member having an integral closed base portion at one end thereof and a chamber therein,
   said chamber extending into said body member and terminating at a location therewithin which is adjacent said closed base portion,
   said closed portion being so constituted and arranged as to sealingly close said metering piston chamber upon assembly of said body member to said valve body,
   a slider longitudinally reciprocably disposed within the chamber for movement between a plurality of positions for indicating lubricant flow through the lubrication valve,
   said metering piston member having an end portion which defines means for influencing the movement of the slider in one direction to one of the indicating positions when said metering piston member is in the first position, and
   means disposed within the chamber operatively associated with the slider to urge the slider in a direction opposed to the one direction and to the other indicating position when said metering piston member is in the second position.

2. The lubricator as set forth in claim 1, together with a transparent bonnet for covering the chamber in the body member of the indicator.

3. The lubricator as set forth in claim 1, wherein the means disposed within the chamber of the body member of the indicator is a bias.

4. The lubricator as set forth in claim 3, wherein said bias is a spring surrounding the slider.

5. The lubricator as set forth in claim 1, wherein said valve body of the lubrication valve and said body member of the indicator are of non-magnetically permeable material, and
said end portion of the metering piston member and said slider are of magnetically permeable material.

6. The lubricator as set forth in claim 5, together with a permanent magnet associated with the metering piston member.

7. The lubricator as set forth in claim 5, together with a permanent magnet associated with the slider.

References Cited by the Examiner

UNITED STATES PATENTS

| | | | |
|---|---|---|---|
| 2,122,177 | 6/1938 | Klein | 184—7 |
| 2,526,568 | 10/1950 | Leonard | 184—1 |
| 2,667,236 | 1/1954 | Grave | 184—7 |
| 2,669,707 | 2/1954 | Ehrman | 340—239 |
| 2,776,567 | 1/1957 | Binford | 73—208 |
| 2,906,282 | 9/1959 | Shannon | 116—34 |
| 2,942,572 | 6/1960 | Pall | 116—117 |
| 2,973,058 | 2/1961 | Bricout | 184—7 |
| 3,011,470 | 12/1961 | Stoermer | 116—117 |
| 3,075,615 | 1/1963 | Thomas | 73—208 |
| 3,080,016 | 4/1963 | Thomas | 184—7 |
| 3,154,049 | 10/1964 | Smith et al. | 116—70 |

FOREIGN PATENTS 296,973   5/1954   Switzerland.

LOUIS J. CAPOZI, *Primary Examiner.*

LEO SMILOW, *Examiner.*